(12) United States Patent  (10) Patent No.: US 7,537,162 B1
Siu  (45) Date of Patent: May 26, 2009

(54) METHODS AND APPARATUS FOR VALIDATING INPUT BY RENDERING A BARCODE

(75) Inventor: Danny Dick-Fung Siu, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 647 days.

(21) Appl. No.: 11/237,026

(22) Filed: Sep. 28, 2005

(51) Int. Cl.
*G06K 7/10* (2006.01)
(52) U.S. Cl. .............................. 235/462.01; 235/462.15
(58) Field of Classification Search ................. 235/376, 235/383, 462.01, 487, 492, 462.15
See application file for complete search history.

(56) References Cited

U.S. PATENT DOCUMENTS

| | | | | |
|---|---|---|---|---|
| 5,450,491 A * | 9/1995 | McNair | ....................... | 713/184 |
| 5,602,377 A * | 2/1997 | Beller et al. | ........... | 235/462.15 |
| 5,939,699 A * | 8/1999 | Perttunen et al. | ........ | 235/462.01 |
| 6,082,620 A * | 7/2000 | Bone, Jr. | ................. | 235/462.16 |
| 6,338,434 B1 * | 1/2002 | Wilz et al. | ............. | 235/462.01 |
| 7,150,400 B2 * | 12/2006 | Melick et al. | ........... | 235/462.25 |
| 2001/0032252 A1 * | 10/2001 | Durst et al. | .................. | 709/218 |
| 2006/0054695 A1 * | 3/2006 | Owada | ........................ | 235/440 |
| 2008/0017722 A1 * | 1/2008 | Snyder et al. | ............... | 235/494 |

\* cited by examiner

*Primary Examiner*—Steven S Paik
*Assistant Examiner*—April A Taylor
(74) *Attorney, Agent, or Firm*—Barry W. Chapin, Esq.; Chapin IP Law, LLC (57) ABSTRACT

A system renders a barcode on a graphical user interface by displaying content within a graphical user interface. The content includes a barcode representing at least a portion of the displayed content. The system detects a change associated with the content displayed within the graphical user interface. In response to the change associated with the content, the system automatically generates a barcode incorporating the change, and automatically updates and displays the barcode on the graphical user interface in association with the content. The barcode reflects the detected change.

26 Claims, 4 Drawing Sheets

FIG. 4

METHODS AND APPARATUS FOR VALIDATING INPUT BY RENDERING A BARCODE

BACKGROUND

Conventional barcode generating software enables a user to create, and manipulate barcodes. A user can enter data that is to be encoded into the barcode, choose a barcode type from a drop down menu, select a button to generate the barcode, then copy and paste the generated barcode to the appropriate location. To save the user the steps of entering data to generate the barcode, conventional barcode generating software allows a user to store, for example, product information, into a database, allowing the user to retrieve that data from the database. The user then feeds the retrieved product information into the barcode generating software to create a barcode that represents the product data retrieved from the database.

Once the barcode is created, conventional barcode generating software allows a user to manipulate (i.e., rotate, resize, etc) the barcode to modify the barcode to fit a user's specifications. The user can then place the modified barcode (i.e. 'cut and paste') in any document, form, web page, product label, etc.

SUMMARY

Conventional technologies that generate barcodes suffer from a variety of deficiencies. In particular, conventional technologies generate barcodes are limited in that the conventional barcode generating systems require a user to specifically indicate when the barcode generating software should encode data into a barcode. The barcode generating software accepts data (to be encoded into a barcode), for example, via a graphical user interface, and generates a barcode when a user, for example, selects a button that triggers encoding of the data on the graphical user interface into a barcode. Once the barcode generating software has generated the barcode on the graphical user interface, it is difficult to verify whether the data on the graphical user interface has been accepted, and encoded, into the generated barcode, or if the data on the graphical user interface has been updated since the barcode was generated, meaning the generated barcode is now obsolete.

Embodiments disclosed herein significantly overcome such deficiencies and provide a system that includes a computer system executing a barcode rendering process that automatically detects a change associated with content displayed within a graphical user interface. In response to the detected change, the barcode rendering process automatically generates a barcode, incorporating the change. The barcode rendering process then displays the barcode (that now reflects the detected change) on the graphical user interface. Since the barcode rendering process can rapidly and continually identify when new input has modified the data upon which the barcode is generated (e.g., user form data), any change to this data, even entry of a single character in a form field that may have many characters, triggers an immediate and automatic update to the barcode on the graphical user interface. Accordingly, there is never a time when the barcode on the graphical user interface is not in synchronization with the data in the graphical user interface upon which the barcode is generated. Thus there is virtually no opportunity for the user to be able to generate a rendition such as a printout of the form without an accurate and up-to-date barcode being present on the form. The invention thus prevents a user from changing data and then printing a form or other information, such as by performing a screen capture, in which the barcode is not based on the data in the graphical user interface.

In an example configuration, the content on the graphical user interface is a form displayed on a graphical user interface. The form contains at least one user modifiable form field, such as a text field, checkboxes, pull down menus and the like. The barcode rendering process automatically and in real-time detects that a user has modified data within one of the user modifiable fields. The modification to a data field could be, for example, detecting a change of at least one character within a data field, detecting a change in a pull down menu setting, or a change to a checkbox. The modification to a data field could also be a change in a drop down menu, check box, radio box, or change in a calendar selector.

In an example configuration, the barcode rendering process, in response to detecting the change, automatically generates the barcode (in response to each change) by aggregating the data associated with the user modifiable form fields into a string variable that is then fed into a barcode encoding process to produce a new version of the barcode containing all the aggregated data (from the user modifiable form fields). The new version of the barcode is then placed within a barcode field within the form on the graphical user interface. All of this processing can be done for each user change, so that the barcode is always up-to-date. In an example configuration, a user is then notified that the modifications the user made for the modifiable form fields were accepted and incorporated into the new version of the barcode. This can be indicated to the user, for example, by showing the barcode with a highlight, for example.

During an example operation of one embodiment, suppose a user, such as a pharmacist, needs to create a barcode label that reflects all the medication information (i.e. medication names, tablet dosages, monthly dosages, number of refills, potential side effects, etc) related to a patient. As the pharmacist enters a change related to the patient medications, such as changing the dosage of a tablet from a 10 mg tablet to a 20 mg tablet, in a tablet dosage form field on a graphical user interface, the barcode rendering process detects a change has been made to the tablet dosage form field. In response to detecting this tablet dosage change, the barcode rendering process automatically aggregates all the data in the form fields (including the updated tablet dosage information), and creates a string variable that contains all the aggregated data. The barcode rendering process then invokes a barcode encoding process that accepts the variable string (containing all the aggregated data including the updated tablet dosage information) as input to the barcode encoding process. The barcode encoding process then generates a new version of the barcode data (containing the change in tablet dosage, as well as all the other medication information related to the patient that was in the previous version of the barcode). The barcode rendering process updates the graphical user interface with the new version of the barcode by placing the new version of the barcode in a barcode field in the form, and notifies the pharmacist that the tablet dosage change has been accepted and incorporated into the barcode. Thus, at any time, when the pharmacist prints out the barcode and affixes it to a patient's file or pill bottle, the barcode reflects the latest changes made to the patient's medication information record.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include methods and a computer system that perform barcode rendering process that detects a change associated with content displayed within a graphical user interface. In response to the detected change, the barcode rendering process automatically generates a barcode, incorporating the change. The barcode rendering process then displays the barcode (that now reflects the detected change) on the graphical user interface.

In an example configuration, the content on the graphical user interface is a form displayed on a graphical user interface. The form contains at least one user modifiable form field. The barcode rendering process detects that a user has modified data within one of the user modifiable fields. The modification to a data field could be, for example, detecting a change of at least one character within a data field. The modification to a data field could also be a change in a drop down menu, check box, radio box, or change in a calendar selector.

In an example configuration, the barcode rendering process automatically generates the barcode by aggregating the data associated with the user modifiable form fields into a string variable that is then fed into a barcode encoding process to produce a new version of the barcode containing all the aggregated data (from the user modifiable form fields). The new version of the barcode is then placed within a barcode field within the form on the graphical user interface. In an example configuration, a user is then notified that the modifications the user made for the modifiable form fields were accepted and incorporated into the new version of the barcode.

Figure 1:
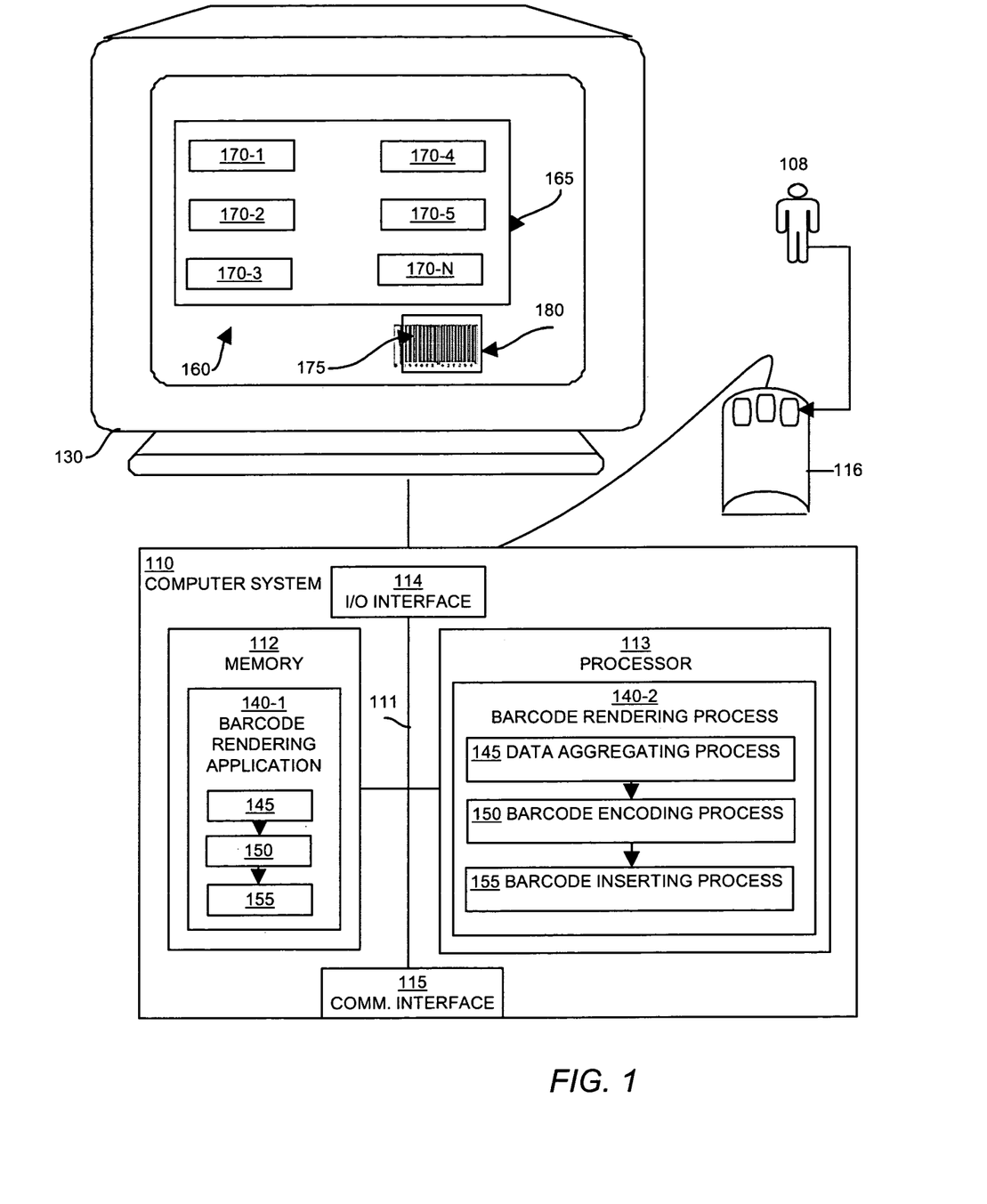
FIG. 1 shows a high-level block diagram of a computer system according to one embodiment disclosed herein.

FIG. 1 is a block diagram illustrating example architecture of a computer system 110 that executes, runs, interprets, operates or otherwise performs a barcode rendering application 140-1 and barcode rendering process 140-2 that includes a data aggregating process 145, a barcode encoding process 150, and a barcode inserting process 155 for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the barcode rendering application 140-1 and process 140-2 provides on the display 130. The graphical user interface 160 displays a form 165 containing user modifiable form fields 170-N and a generated barcode 175 within a barcode form field 180. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a barcode rendering application 140-1 that includes a data aggregating process 145, a barcode encoding process 150, and a barcode inserting process 155 as explained herein. The barcode rendering application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the barcode rendering application 140-1. Execution of barcode rendering application 140-1 in this manner produces processing functionality in a barcode rendering process 140-2. In other words, the barcode rendering process 140-2 represents one or more portions or runtime instances of the barcode rendering application 140-1 (or the entire barcode rendering application 140-1) performing or executing within or upon the processor 113 in the computerized device 110 at runtime. The data aggregating process 145, barcode encoding process 150 and barcode inserting process 155 are included in this processing and operate as explained herein to aggregate the data supplied by a user 108 within the form fields 170-N in the form 165, encode the data into a barcode 175, and insert the barcode 175 into a barcode form field 180 within the graphical user interface 160.

It is noted that example configurations disclosed herein include the barcode rendering application 140-1 itself including the data aggregating process 145, barcode encoding process 150 and barcode inserting process 155 (i.e., in the form of un-executed or non-performing logic instructions and/or data). The barcode rendering application 140-1 may be stored on a computer readable medium (such as a floppy disk), hard disk, electronic, magnetic, optical, or other computer readable medium. The barcode rendering application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the barcode rendering application 140-1 in the processor 113 as the barcode rendering process 140-2 including the data aggregating process 145, barcode encoding process 150 and barcode inserting process 155. Those skilled in the art will understand that the computer system 110 may include other processes and/or software and hardware components, such as an operating system not shown in this example.

A display 130 need not be coupled directly to computer system 110. For example, the barcode rendering application 140-1 can be executed on a remotely accessible computerized device via the network interface 115. In this instance, the graphical user interface 160 may be displayed locally to a user of the remote computer and execution of the processing herein may be client-server based.

Further details of configurations explained herein will now be provided with respect to a flow chart of processing steps that show the high level operations disclosed herein to perform the barcode rendering process 140-2.

Figure 2:
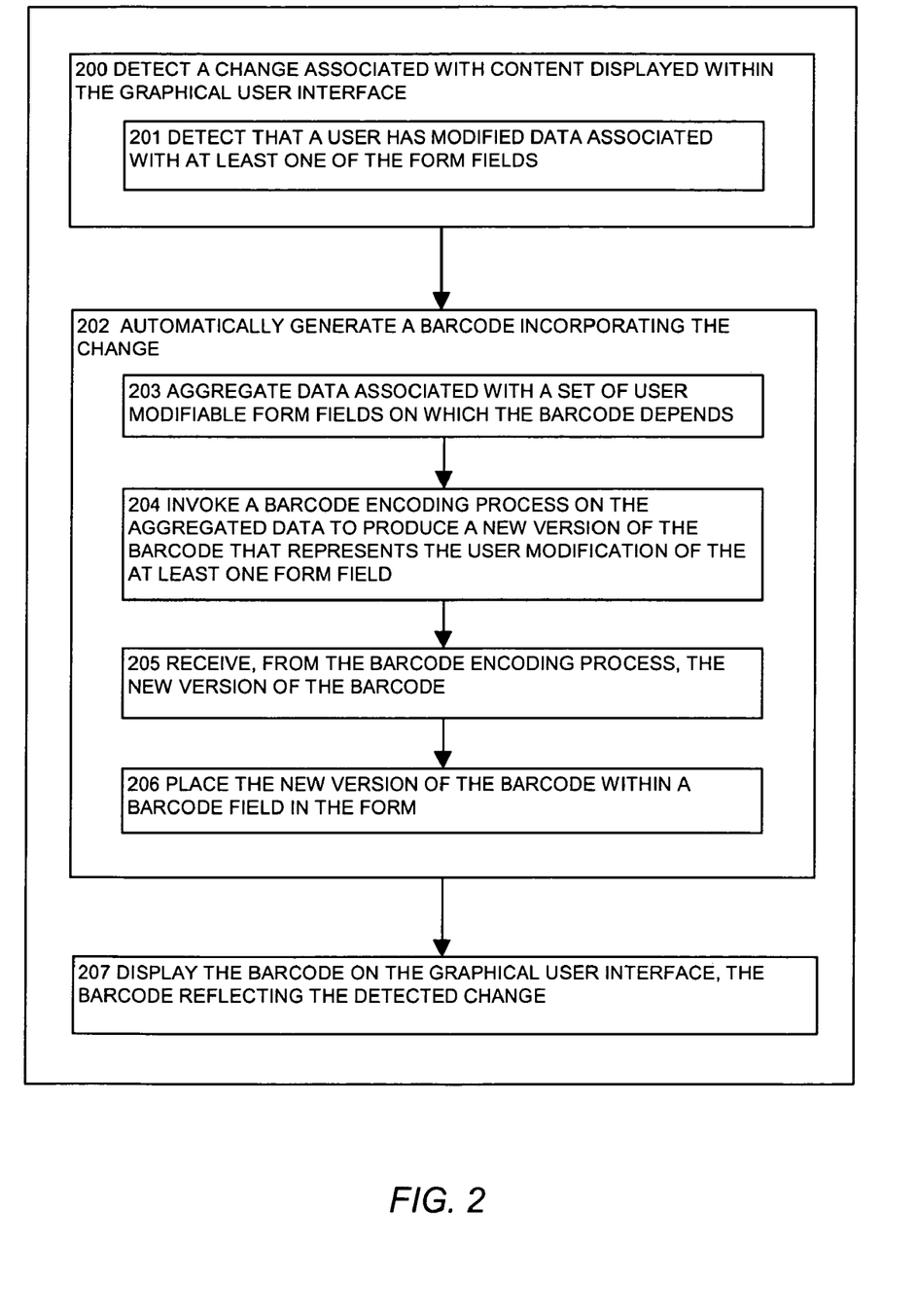
FIG. 2 illustrates a flowchart of a procedure performed by the barcode rendering process when it detects a change associated with content displayed within a graphical user interface, according to one embodiment disclosed herein.

FIG. 2 is a flowchart of the steps performed by the barcode rendering process 140-2 when it detects a change in content on a graphical user interface 160, and generates a new version of a barcode 175, containing the change.

In step 200, the barcode rendering process 140-2 displays content within a graphical user interface 160. The content includes a barcode representing at least a portion of the displayed content. The barcode rendering process 140-2 then detects a change associated with content displayed within the graphical user interface 160. In an example configuration, the content within the graphical user interface 160 is a form 165 including at least one user modifiable form field 170-1.

In step 201, the barcode rendering process 140-2 detects that a user 108 has modified data associated with at least one of the form fields 170-1. For example, a user 108 could change one character within a data field, choose one option within a drop down menu, select (or deselect) a check box, select (or deselect) a radio button, or pick a date within calendar selector. In any of these examples, the barcode rendering process 140-2 detects this change.

In response to the change associated with the content, in step 202, the barcode rendering process 140-2 automatically generates a barcode 175 incorporating the detected change. The barcode rendering process 140-2 detects even the smallest change associated with any of the form fields 170-N, and incorporates this change into the new version of the barcode 175.

In step 203, the barcode rendering process 140-2 aggregates data associated with a set of user modifiable form fields 170-N on which the barcode depends. In an example configuration, all of the data in the user modifiable form fields 170-N is collected, and aggregated each time any of the form fields 170-N is modified.

In step 204, the barcode rendering process 140-2 invokes a barcode encoding process 145 on the aggregated data to produce a new version of the barcode 175 that represents the user 108 modification of at least one form field 170-1. The barcode rendering process 140-2 invokes a barcode encoding process 145, and supplies the aggregated data as input to the barcode encoding process 145.

In step 205, the barcode rendering process 140-2 receives, from the barcode encoding process 145, the new version of the barcode 175. In an example configuration, the input to the barcode encoding process 145 is the aggregated data (representing user 108 modification of at least one of the form fields 170-1), and the output from the barcode encoding process 145 is the new version of the barcode 175.

In step 206, the barcode rendering process 140-2 places the new version of the barcode 175 within a barcode field 180 in the form 165. The barcode rendering process 140-2 invokes a barcode inserting process 155, and passes the new version of the barcode 175 (supplied as the output of the barcode encoding process 145) to the barcode inserting process 155. The barcode inserting process 155 then places the new version of the barcode 175 into a barcode form field 180 within the form 165.

In step 207, the barcode rendering process 140-2 updates and displays the barcode 175 on the graphical user interface 160. The now new version of the barcode 175 reflects the change detected in any of the form fields 170-N by the barcode rendering process 140-2. In an example configuration, the barcode rendering process 140-2 detects a series of modifications to the form fields 170-N. The barcode rendering process 140-2 then performs the steps of aggregating data, automatically invoking the barcode process 145, receiving a new version of the barcode 175, and placing the new version of the barcode 175 within a barcode field 180 in the form 165 in response to detecting each modification in the series of modifications to the form fields 170-N.

Figure 3:
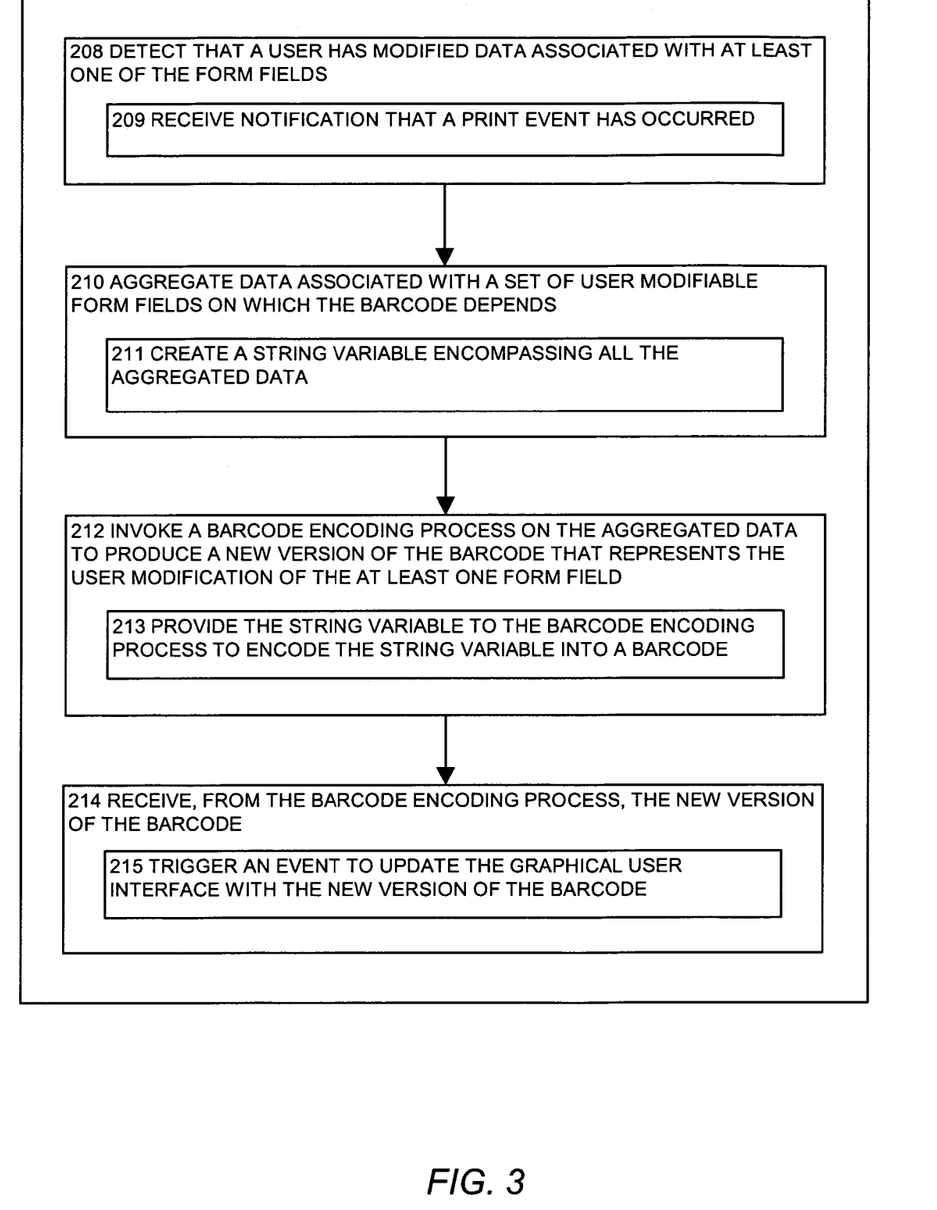
FIG. 3 illustrates a flowchart of a procedure performed by the barcode rendering process when it detects that a user has modified data associated with at least one of the form fields, according to one embodiment disclosed herein.

FIG. 3 is a flowchart of the steps performed by the barcode rendering process 140-2 when it detects that a user 108 has modified data associated with at least one of the form fields 170-N. The user 108 can modify data within the form field 170-N via a keyboard (as in the case of a data field) or via a mouse (as in the case of a drop down menu, radio button, check box, or calendar selector).

In step 208, the barcode rendering process 140-2 detects that a user 108 has modified data associated with at least one of the form fields 170-N. Alternatively, the barcode rendering process 140-2 determines that a timing event has expired, and a new barcode 175 should be generated (based on the timing event having expired).

In step 209, the barcode rendering process 140-2 receives notification that a print event has occurred. In an example configuration, when a user 108 prints a barcode 175, the barcode rendering process 140-2 receives notification that a print event has occurred, and triggers generation of a new barcode 178.

In step 210, the barcode rendering process 140-2 aggregates data associated with a set of user modifiable form fields 170-N on which the barcode depends (meaning the barcode is generated to represent data within the user modifiable form fields 170-N). The barcode rendering process 140-2 receives data from all the form fields 170-N within the form 165. It is this data that will be encoded into a new barcode 175. Thus, the aggregated data represents both the updated form field 170-1, and the unchanged form fields 170-N.

In step 211, the barcode rendering process 140-2 creates a string variable encompassing all the aggregated data. The barcode rendering process 140-2 collects all the data within the user modifiable form fields 170-N, and creates a string variable that contains all the data collected.

In step 212, the barcode rendering process 140-2 invokes a barcode encoding process 145 on the aggregated data to produce a new version of the barcode 175 that represents the user 108 modification of at least one form field 170-1.

In step 213, the barcode rendering process 140-2 provides the string variable to the barcode encoding process 145 to encode the string variable into a barcode 175. The string variable, containing all the aggregated data, is supplied as input to the barcode encoding process 145.

In step 214, the barcode rendering process 140-2 receives, from the barcode encoding process 145, the new version of the barcode 175. In an example configuration, the input to the barcode encoding process 145 is the string variable containing the aggregated data, and the output is a new version of the barcode 175 that has been updated to now represent the aggregated data.

In step 215, the barcode rendering process 140-2 triggers an event to update the graphical user interface 160 with the new version of the barcode 175. The barcode rendering process receives the new version of the barcode 175, as output, from the barcode encoding process 145, and invokes the barcode inserting process 155 to update the graphical user interface 160 with the new version of the barcode 175.

Figure 4:
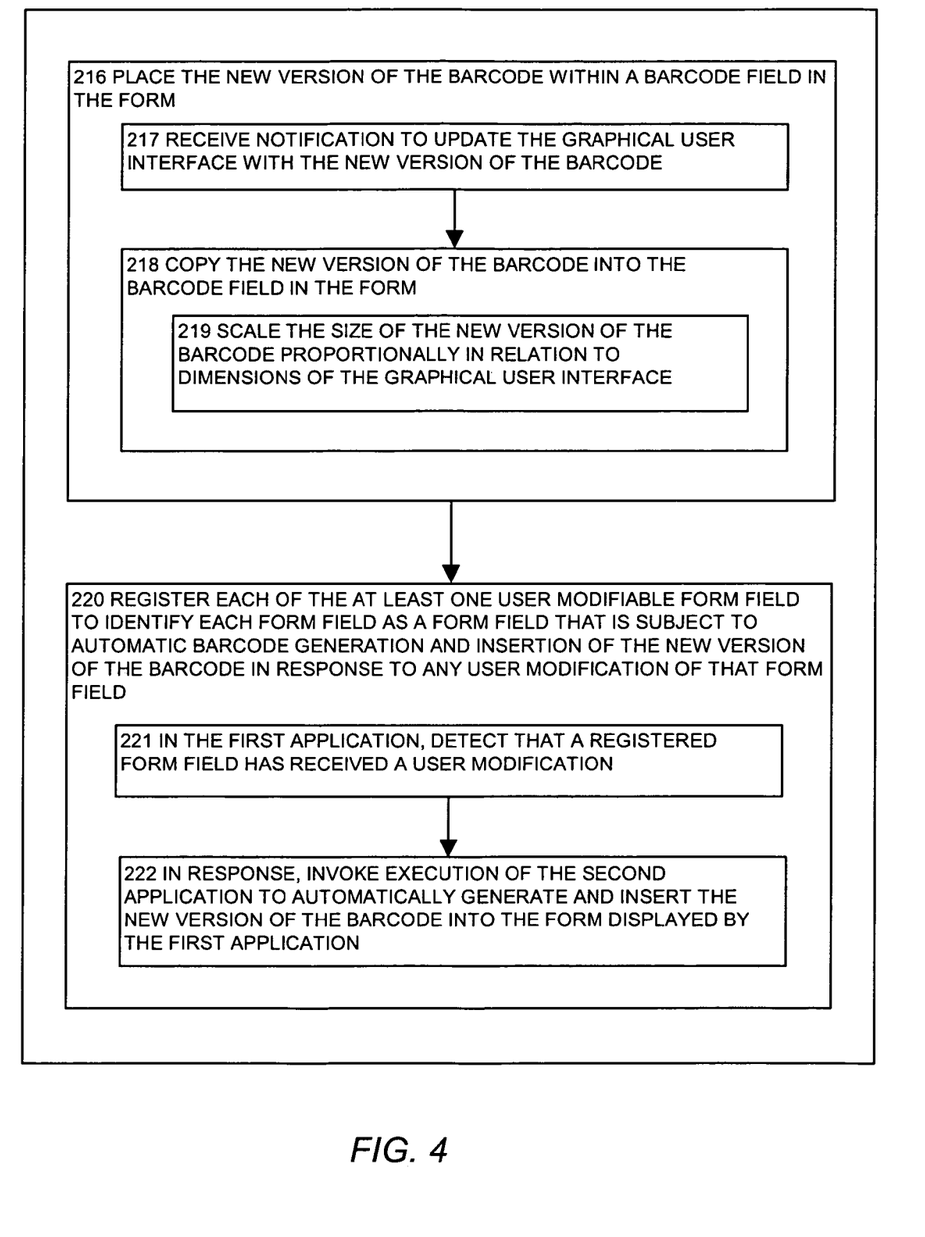
FIG. 4 illustrates a flowchart of a procedure performed by the barcode rendering process when it places the new version of the barcode within a barcode field in the form, according to one embodiment disclosed herein.

FIG. 4 is a flowchart of the steps performed by the barcode rendering process 140-2 when it places the new version of the barcode 175 within a barcode field 180 in the form 165 on the graphical user interface 160.

In step 216, the barcode rendering process 140-2 places the new version of the barcode 175 within a barcode field 180 in the form 165. The barcode rendering process 140-2 also notifies the user 108 that the barcode rendering process 140-2 has accepted the change to the modifiable form fields 170-N. In an example configuration, the barcode rendering process 140-2 has also validated the data entered into the modifiable form fields 170-N.

In step 217, the barcode rendering process 140-2 receives notification to update the graphical user interface 160 with the new version of the barcode 175. The barcode rendering process 140-2 receives the new version of the barcode 175 as output from the barcode encoding process 150, and, in response, invokes the barcode inserting process 155.

In step 218, the barcode rendering process 140-2 copies the new version of the barcode 175 into the barcode field 180 in the form 165. The barcode inserting process 155 inserts the new version of the barcode 175 into the barcode field 180 in the form 165. In an example configuration, the user 108 is notified that modification to the form field 170-N has been accepted, and those modifications have been incorporated into the new version of the barcode 175. In another example configuration, notifying the user 108 that modification to the form field 170-N has been accepted also validates the modification to the form field 170-N made by the user 108.

In step 219, the barcode rendering process 140-2 scales the size of the new version of the barcode 108 proportionally in relation to dimensions of the graphical user interface 160. Thus, if a user 108 is modifying form fields 170-N on a hand held personal computer, phone screen, etc, the new version of the barcode 175 will be scaled proportionally to fit the dimensions of that device.

In step 220, the barcode rendering process 140-2 registers each of the user modifiable form fields 170-N to identify each form field 170-N as a form field 170-N that is subject to automatic barcode generation and insertion of the new version of the barcode 175, in response to any user 108 modification of that form field 170-N.

In step 221, the operations of automatically generating a barcode incorporating the change and placing the new version of the barcode within a barcode field in the form are performed by a first application, and the barcode rendering process 140-2 detects that a registered form field 170-N has received a user 108 modification, in the first application.

In step 222, a second application that displays the form 165 on the graphical user interface 160, and that receives user 108 modifications to at least one form field 170-N, executes separately from the first application (as described within in sub step 221). In response, the barcode rendering process 140-2 invokes execution of the second application to automatically generate and insert the new version of the barcode 175 into the form 165 displayed by the first application.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method of rendering a barcode on a graphical user interface, the method comprising:
   displaying content within a graphical user interface, the content including a barcode representing at least a portion of the displayed content;
   detecting a change associated with the content displayed within the graphical user interface, wherein detecting the chance includes: detecting modified data associated with at least one user modifiable field in the content;
   in response to the change associated with the content:
      i) automatically generating a barcode incorporating the change; and
      ii) automatically updating and displaying the barcode on the graphical user interface in association with the content, the barcode reflecting the detected change.

2. The method of claim 1 wherein the content is a form displayed on a graphical user interface, the form including at least one user modifiable form field; and
   wherein the step of detecting a change associated with content displayed within the graphical user interface comprises;
      detecting that a user has modified data associated with at least one of the form fields; and
   wherein automatically generating a barcode incorporating the change comprises:
      aggregating data associated with a set of user modifiable form fields on which the barcode depends;
      invoking a barcode encoding process on the aggregated data to produce a new version of the barcode that represents the user modification of the at least one form field;
      receiving, from the barcode encoding process, the new version of the barcode; and
      placing the new version of the barcode within a barcode field in the form.

3. The method of claim 2 wherein detecting that a user has modified data associated with at least one of the form fields comprises:
   detecting a series of modifications to the form fields; and
   wherein automatically generating a barcode incorporating the change comprises:

performing the steps of aggregating data, automatically invoking a barcode process, receiving the new version of the barcode, and placing the new version of the barcode within a barcode field in the form in response to detecting each modification in the series of modifications to the form fields.

4. The method of claim 2 wherein detecting that a user has modified data associated with at least one of the form fields comprises at least one of:
   i) detecting a change of at least one character within a data field;
   ii) detecting a change of at least one option within a drop down menu;
   iii) detecting a change in a check box;
   iv) detecting a change a radio button; and
   v) detecting a change a calendar selector.

5. The method of claim 2 wherein detecting that a user has modified data associated with at least one of the form fields comprises:
   receiving notification that a print event has occurred.

6. The method of claim 2 wherein aggregating data associated with a set of user modifiable form fields on which the barcode depends comprises:
   creating a string variable encompassing all the aggregated data;
   and wherein invoking a barcode encoding process on the aggregated data comprises:
   providing the string variable to the barcode encoding process to encode the string variable into a barcode; and
   wherein receiving, from the barcode encoding process, the new version of the barcode comprises:
   triggering an event to update the graphical user interface with the new version of the barcode.

7. The method of claim 2 wherein placing the new version of the barcode within a barcode field in the form comprises:
   receiving notification to update the graphical user interface with the new version of the barcode; and
   copying the new version of the barcode into the barcode field in the form.

8. The method of claim 7 wherein copying the new version of the barcode into the barcode field in the form comprises:
   scaling the size of the new version of the barcode proportionally in relation to dimensions of the graphical user interface.

9. The method of claim 2 comprising:
   registering each of the at least one user modifiable form field to identify each form field as a form field that is subject to automatic barcode generation and insertion of the new version of the barcode in response to any user modification of that form field.

10. The method of claim 9 wherein the operations of automatically generating a barcode incorporating the change and placing the new version of the barcode within a barcode field in the form are performed by a first application that executes separately from a second application that displays the form on the graphical user interface and that receives user modifications to the at least one form field;
   and wherein the method comprises:
      in the first application, detecting that a registered form field has received a user modification; and
      in response, invoking execution of the second application to automatically generate and insert the new version of the barcode into the form displayed by the first application.

11. The method of claim 1 wherein detecting a change associated with content displayed within the graphical user interface comprises:
   receiving notification that a timing event has expired.

12. The method of claim 1 wherein displaying the barcode on the graphical user interface comprises:
   notifying a user that modification to a form field by the user has been accepted, and incorporated into the barcode.

13. A computerized device comprising:
   a memory;
   a processor;
   a communications interface;
   an interconnection mechanism coupling the memory, the processor and the communications interface;
   wherein the memory is encoded with an barcode rendering application that when executed on the processor renders a barcode on the computerized device by performing the operations of:
   displaying content within a graphical user interface, the content including a barcode representing at least a portion of the displayed content;
      detecting a change associated with the content displayed within the graphical user interface, wherein detecting the change includes: detecting modified data associated with at least one user modifiable field in the content;
      in response to the change associated with the content:
         i) automatically generating a barcode incorporating the change; and
         ii) automatically updating and displaying the barcode on the graphical user interface in association with the content, the barcode reflecting the detected change.

14. The computerized device of claim 13 wherein the content is a form displayed on a graphical user interface, the form including at least one user modifiable form field; and
   wherein when the computerized device performs the operation of detecting a change associated with content displayed within the graphical user interface, the computerized device performs the operation of:
      detecting that a user has modified data associated with at least one of the form fields; and
   wherein when the computerized device performs the operation of automatically generating a barcode incorporating the change, the computerized device performs the operations of:
      aggregating data associated with a set of user modifiable form fields on which the barcode depends;
      invoking a barcode encoding process on the aggregated data to produce a new version of the barcode that represents the user modification of the at least one form field;
      receiving, from the barcode encoding process, the new version of the barcode; and
      placing the new version of the barcode within a barcode field in the form.

15. The computerized device of claim 14 wherein when the computerized device performs the operation of detecting that a user has modified data associated with at least one of the form fields, the computerized device performs the operation of:
   detecting a series of modifications to the form fields; and
   wherein when the computerized device performs the operation of automatically generating a barcode incorporating the change, the computerized device performs the operation of:
      performing the steps of aggregating data, automatically invoking a barcode process, receiving the new version of the barcode, and placing the new version of the barcode within a barcode field in the form in response to detecting each modification in the series of modifications to the form fields.

16. The computerized device of claim 14 wherein when the computerized device performs the operation of detecting that a user has modified data associated with at least one of the form fields, the computerized device performs the operation of at least one of:
 i) detecting a change of at least one character within a data field;
 ii) detecting a change of at least one option within a drop down menu;
 iii) detecting a change in a check box;
 iv) detecting a change a radio button; and
 v) detecting a change a calendar selector.

17. The computerized device of claim 14 wherein when the computerized device performs the operation of detecting that a user has modified data associated with at least one of the form fields, the computerized device performs the operation of:
 receiving notification that a print event has occurred.

18. The computerized device of claim 14 wherein when the computerized device performs the operation of aggregating data associated with a set of user modifiable form fields on which the barcode depends, the computerized device performs the operation of:
 creating a string variable encompassing all the aggregated data;
 and wherein when the computerized device performs the operation of invoking a barcode encoding process on the aggregated data, the computerized device performs the operation of:
 providing the string variable to the barcode encoding process to encode the string variable into a barcode; and
wherein when the computerized device performs the operation of receiving, from the barcode encoding process, the new version of the barcode, the computerized device performs the operation of:
 triggering an event to update the graphical user interface with the new version of the barcode.

19. The computerized device of claim 14 wherein when the computerized device performs the operation of placing the new version of the barcode within a barcode field in the form, the computerized device performs the operations of:
 receiving notification to update the graphical user interface with the new version of the barcode; and
 copying the new version of the barcode into the barcode field in the form.

20. The computerized device of claim 19 wherein when the computerized device performs the operation of copying the new version of the barcode into the barcode field in the form, the computerized device performs the operation of:
 scaling the size of the new version of the barcode proportionally in relation to dimensions of the graphical user interface.

21. The computerized device of claim 14 wherein the computerized device performs the operation of:
 registering each of the at least one user modifiable form field to identify each form field as a form field that is subject to automatic barcode generation and insertion of the new version of the barcode in response to any user modification of that form field.

22. The computerized device of claim 21 wherein the operations of automatically generating a barcode incorporating the change and placing the new version of the barcode within a barcode field in the form are performed by a first application that executes separately from a second application that displays the form on the graphical user interface and that receives user modifications to the at least one form field;
 and wherein the computerized device performs the operations of:
 in the first application, detecting that a registered form field has received a user modification; and
 in response, invoking execution of the second application to automatically generate and insert the new version of the barcode into the form displayed by the first application.

23. The computerized device of claim 13 wherein when the computerized device performs the operation of detecting a change associated with content displayed within the graphical user interface, the computerized device performs the operation of:
 receiving notification that a timing event has expired.

24. The computerized device of claim 13 wherein when the computerized device performs the operation of displaying the barcode on the graphical user interface, the computerized device performs the operation of:
 notifying a user that modification to a form field by the user has been accepted, and incorporated into the barcode.

25. A computer readable medium encoded with computer programming logic that when executed on a process in a computerized device produces a barcode rendering process that renders a barcode by causing the computerized device to perform the operations of:
 detecting a change associated with content displayed within the graphical user interface, wherein detecting the change includes: detecting modified data associated with at least one user modifiable field in the content;
 in response to the change associated with the content:
 i) automatically generating a barcode incorporating the change; and
 ii) displaying the barcode on the graphical user interface, the barcode reflecting the detected change.

26. A computerized device comprising:
 a memory;
 a processor;
 a communications interface;
 an interconnection mechanism coupling the memory, the processor and the communications interface;
where the memory is encoded with a barcode rendering application that when executed on the processor configures the computerized device with a means for rendering a barcode, the means including:
means for displaying content within a graphical user interface, the content including a barcode representing at least a portion of the displayed content;
 means for detecting a change associated with the content displayed within the graphical user interface, wherein detecting the change includes: detecting modified data associated with at least one user modifiable field in the content;
 in response to the change associated with the content:
 i) means for automatically generating a barcode incorporating the change; and
 ii) means for automatically updating and displaying the barcode on the graphical user interface in association with the content, the barcode reflecting the detected change.

* * * * *

UNITED STATES PATENT AND TRADEMARK OFFICE
CERTIFICATE OF CORRECTION

PATENT NO. : 7,537,162 B1　　　　　　　　　　　　　　　　　　　　Page 1 of 1
APPLICATION NO. : 11/237026
DATED : May 26, 2009
INVENTOR(S) : Danny Dick-Fung Siu It is certified that error appears in the above-identified patent and that said Letters Patent is hereby corrected as shown below:

Claim 1, Column 8, Line 33, "the chance includes: detecting modified data associated" should read --the change includes: detecting modified data associated--.

Signed and Sealed this

Eighteenth Day of August, 2009

David J. Kappos
*Director of the United States Patent and Trademark Office*